United States Patent Office 3,023,664
Patented Mar. 6, 1962

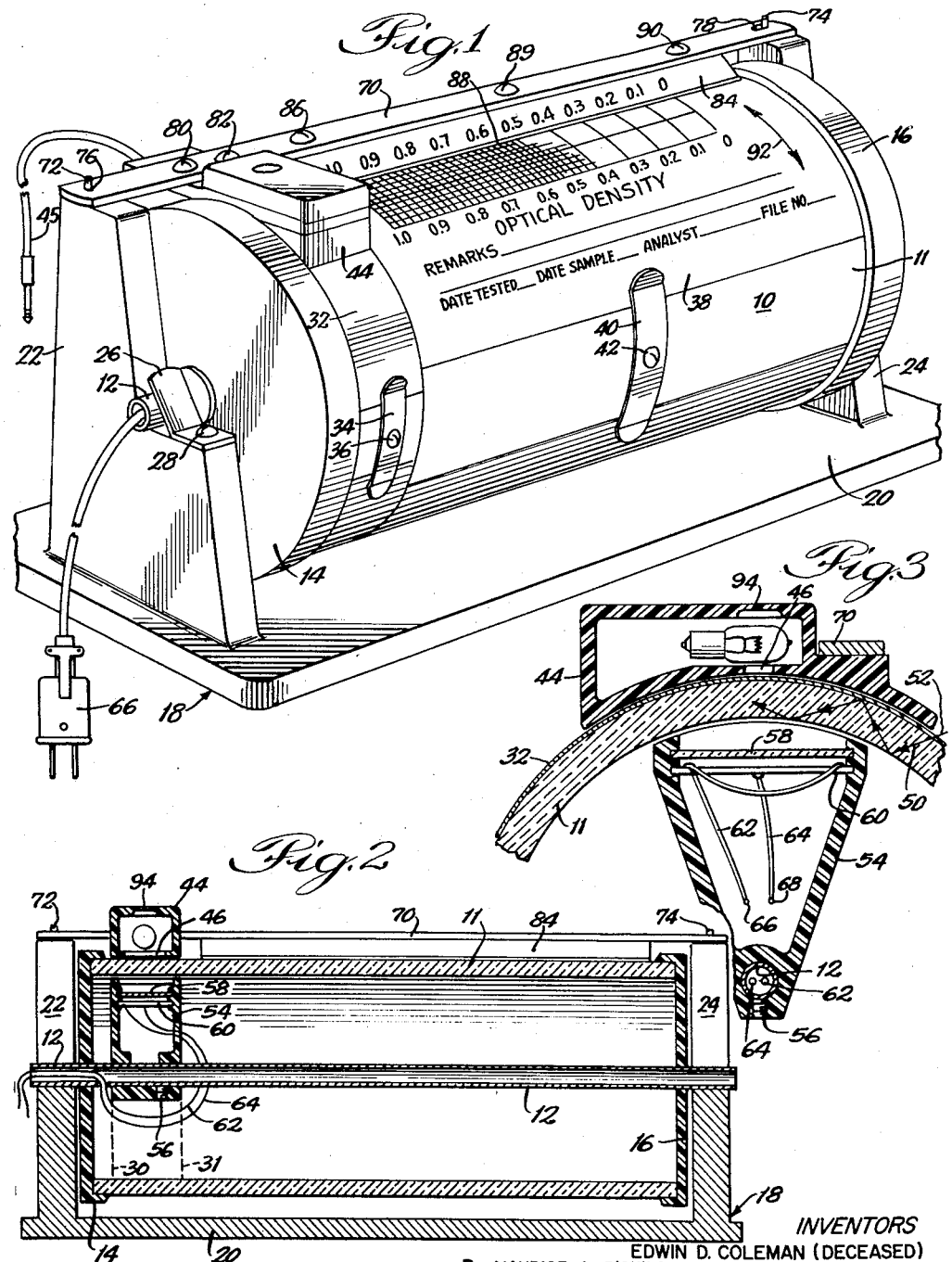

3,023,664
CHROMATOGRAPHIC READER
Edwin D. Coleman, deceased, late of Chicago, Ill., by Maurice A. Riskind and Northern Trust Company, co-executors, Chicago, and John J. J. Staunton, Oak Park, Ill., assignors to Coleman Instruments, Inc.
Filed Dec. 3, 1959, Ser. No. 857,014
12 Claims. (Cl. 88—14)

This invention relates generally to a chromatographic apparatus, and more particularly to new and improved apparatus for facilitating the reading, evaluating and recording of dye patterns on chromatographic strips.

Those skilled in the art of partition chromatography are familiar with the use of filter paper strips, often referred to as chromatographic or electrophoretic strips, for analytical or diagnostic determinations based upon the separation of substances applied to the strips due to the differences in the ion migration of such substances within the strips. Thus, after the substances which are to be studied have been applied to a filter paper strip and the separation has been completed, the strip is subjected to the action of certain dyes added thereto with the result that the separated substances are rendered visible as colored areas which form a dye pattern characteristic of the particular substances under study. The dye or chromatographic pattern thus formed on the filter paper strip may then be analyzed to determine the various separated substances present at the corresponding points of the strip.

Since it has been shown that the strip's optical density—the inverse logarithm of the light transmission of the strip—is a direct measure of the concentration of the separated substances on the filter paper strip, various devices have been proposed in the prior art for scanning the chromatographic strips to provide an indication of the strip's optical density to the end that density plots, or so-called absorption curves, may be prepared from the strips.

Accordingly, it is a general object of this invention to provide a new and improved chromatographic strip reading device for facilitating the scanning, evaluating and recording of the chromatographic pattern on an electrophoretic filter paper strip.

It is another object of this invention to provide such a chromatographic strip reading device which comprises a hollow, rotatable drum adapted to receive both the chromatographic strip and a sheet of cross section or graph paper in predetermined spatial relation to each other upon the outer surface of the drum.

In accordance with the features of the specific illustrative embodiment of this invention, as illustrated in greater detail herein below, a hollow drum is rotatably journalled on a fixed shaft which extends along the longitudinal axis of the drum. This axial shaft also is hollow and is supported by and secured to a suitable rigid base such that the shaft does not rotate when the drum is rotated thereupon during scanning of the chromatographic strip.

Advantageously, a portion of the drum surface is opaque to inhibit the light transmission therethrough while the remainder of the drum surface is transparent to facilitate light transmission therethrough. The chromatographic strip to be scanned is positioned around the transparent portion of the drum between a light source in a fixed position lamphead mounted on the outside of the drum and a fixed position light sensitive current generator, as for example a photocell, mounted on the axial shaft within the hollow drum.

The lamphead is formed with a fixed optical slit which is rigidly aligned with the light source so that as the sample chromatographic strip being scanned is rotated on the drum between the lamphead and the photocell, the light from the lamphead is directed through the sample strip in a desired manner. A photocell response to this light is in the form of an electric current representative of the dye or chromatographic pattern, and this current is supplied to a pair of terminals adapted to be connected to a suitable galvanometer to the end that the reading due to the dye pattern is directly indicated upon the galvanometer scale.

The cross section paper is positioned around the opaque portion of the drum in exact juxtaposition to the sample strip so that both the strip and the paper move together when the drum is rotated. A scale member having a guide edge aligned with the optical slit in the lamphead is positioned adjacent the cross section paper in parallel with the axial drum shaft. The guide edge is suitably marked, as with optical density numbers, to enable each density value indicated upon the galvanometer during scanning of the strip to be immediately marked upon the cross section paper at a point corresponding to the strip dye pattern position being scanned. Thus, a point on the cross section paper located at the scale edge and at the concurrent galvanometer value is always a point on the absorption curve of the sample strip.

The invention not only greatly simplifies the task of plotting the absorption curve of a chromatographic strip, but in addition it assures far greater accuracy and immediately shows both those regions of the curve where little, if any, additional data is needed and where considerable additional data is required for the desired definition. Since the drum is freely rotatable in either direction within the scope of the sample strip, the operator can freely backtrack and fill in additional points as indicated by the developing absorption curve.

Accordingly, it is an object of this invention to provide a relatively simple, yet highly accurate, means for scanning a chromatographic strip and developing an absorption curve therefrom by attaching both the strip and the cross section paper in juxtaposition on the outer surface of a rotating drum.

Another object of this invention is to provide such a chromatographic reading device of new and improved construction which assures that substantially all of the light from the scanning beam is collected and directed through the strip to the measuring photocell, while at the same time extraneous light is effectively prevented from reaching the photocell.

It is another object of this invention to provide an improved chromatographic reading device, as above, wherein the reading of the measuring galvanometer may be transferred without computation directly to the graph paper, while still making it possible for a linear scale to be used on the measurement galvanometer such that the final curve automatically has ordinates directly proportional to concentration. Thus, the area under the absorption curve on the graph may readily be planimetered or otherwise measured to ascertain the concentration of each component shown by the curve.

It is still another object of this invention to provide a new and improved lamphead assembly and scale member for a chromatographic reading device which can be replaced quickly and easily in the event of lamp failure without the necessity of further alignment by the operator of the device.

It is another object of this invention to provide a new and improved lamphead assembly which is easily removed from the chromatographic reading device to permit immediate substitution of other lamphead assemblies having different slit widths, as required by the density of the dye pattern and by the resolution desired for the particular measurement.

It is still another object of this invention to provide such a new and improved chromatographic reading device which comprises an integral and easily replaceable photocell assembly such that substitution of one photocell assembly for another is facilitated in the event of photocell failure or in the event the measurement requires a unit containing a different filter window.

It is a still further object of this invention to provide a new and improved chromatographic reading device, as above, wherein the intimate contact between the slit in the lamphead and the chromatographic strip eliminates the necessity for expensive optical focusing means to assure sharp definition of the light beam coming from the slit at the point where the beam strikes the slit. Adequate resolution, that is, separation of the point-to-point variations of the dye pattern along its length, can thus be effected without a complex optical system and without the need of focusing operations by the operator.

It is a still further object of this invention to provide a new and improved lamphead assembly for a chromatographic reading device which comprises unique pilot light indicating means for providing indications of the lamp operation within the lamphead.

It is still another object of this invention to provide a new and improved chromatographic reading device, as above, which is characterized by its relative simplicity, its economy of construction and its high degree of accuracy and efficiency in measuring chromatographic strips and in enabling the preparation of dye pattern absorption curves therefrom.

The novel features which are characteristic of the invention are set forth with particularity in the appended claims. The invention itself, however, both as to its organization and method of operation, together with further objects and advantages thereof, will best be understood by reference to the following description taken in combination with the accompanying drawings in which:

FIGURE 1 is a perspective view of one illustrative embodiment of a chromatographic reading device in accordance with the invention;

FIGURE 2 is a cross sectional view of the device shown in FIGURE 1, taken along the horizontal longitudinal axis thereof; and FIGURE 3 is a transverse cross sectional view of the device of FIGURE 1 illustrating the construction of the lamphead assembly, the drum and the photocell unit.

Referring now to the drawing and more particularly to FIGURE 1 thereof there is illustrated a chromatographic reading device embodying the invention. In accordance with specific features of this invention, the chromatographic reading device comprises an elongated, cylindrical, hollow drum 10 suitably journalled for rotation about a fixed shaft 12 extending along the longitudinal axis of drum 10. Advantageously, the drum cylinder 11 is formed of a suitable plastic material, such as Lucite, and in one practical embodiment constructed in accordance with the invention, the drum cylinder was approximately 12″ long and 6″ in diameter with a wall thickness of approximately ¼″.

The open ends of the hollow drum cylinder 11 are adapted to be covered by the plastic or metal end caps 14 and 16, respectively, which are cup shaped and thereby adapted to be force-fitted over the ends of drum cylinder 11. Accordingly, the drum formed by the hollow cylinder and the end caps is adapted to freely rotate about the axial shaft 12. It is contemplated that the end caps 14 and 16 may be provided with knurled edges to facilitate the manual rotation of the drum 10.

The drum and axial shaft assembly is supported by a rigid support member 18 which comprises the base 20 and the oppositely positioned upstanding arms 22 and 24, respectively, communicating with the opposite ends of the axial shaft 12. Each arm of the support member 20 is provided with a hold down clamp—such as the hold down clamp 26 secured to the support arm 22 by the screw 28—adapted to firmly engage an end of the axial shaft 12 in such a way that the shaft does not rotate when the drum is rotated. To this end the hold down clamps may take the form of any suitable metal resilient spring or the like.

In accordance with a further feature of this invention, the major portion of the plastic cylinder 10 is provided with an opaque coating on the outer surface thereof to prevent the transmission of light therethrough, while the remaining portion of the cylinder is substantially transparent to facilitate the transmission of light therethrough. As shown in the embodiment of FIGURE 2, the dotted lines identified by the reference numerals 30 and 31 separate the opaque and the transparent portions of the drum, the transparent portion being between the lines 30 and 31.

The chromatographic strip 32 to be scanned and measured by the invention is shown as wrapped around the transparent portion of the drum. To facilitate the firm attachment of the chromatographic strip 32 to the drum, a suitable resilient hold down clip 34 is secured to the drum, as by the screw 36, and it can be seen that each end of the clip 34 firmly presses one end of the strip 32 to the transparent portion of the drum.

In a similar fashion the sheet of cross section or graph paper 38, upon which the absorption curve of the dye pattern on a chromatographic strip is to be developed, is wrapped around an opaque portion of the drum. To secure the graph paper 38 firmly in place, a resilient hold down clip 40 is secured to the drum, as by the screw 42, and each end of the clip 40 serves to press an end of the graph paper 38 firmly against the drum surface. Thus, it can be seen that in the operation of the invention the chromatographic strip 32 and its corresponding graph paper 38 are held in predetermined spatial relation to each other upon the outer surface of a drum on transparent and opaque portions thereof respectively.

In accordance with the invention, the chromatographic or dye pattern on the strip 32 is scanned and measured by means of a light source positioned adjacent the strip 32 on the outside surface of the drum and a light responsive photocell positioned adjacent the strip within the hollow interior of the drum.

It is a specific feature of this invention that the light source takes the form of a suitable light source 43, such as an incandescent lamp, positioned within a unitary, easily replaceable lamphead assembly 44. Power for the light source is obtained through the power cord and plug 45, which advantageously may be connected to the power terminals of the associated galvanometer measuring instrument.

As shown in greater detail in FIGURE 3 of the drawing the unitary lamphead assembly 44 comprises a hollow housing having a narrow optical slit 46 immediately below the filament of the incandescent lamp 43 such that a narrow beam of light is transmitted from the lamp housing 44 to the chromatographic strip 32 directly adjacent the curved underside of the lamp housing 44. In a practical construction of the invention, the chromatographic strip 32 advantageously is somewhat wider than the transparent portion of the drum so that any light which is transmitted from the narrow slit 46 of the lamp housing 44 must traverse a chromatographic strip.

It is a further feature of the invention that the curved underside of the lamp housing 44 extends from the narrow slit 46 in both directions around the outside surface of the plastic cylinder 11 a sufficient distance such that any extraneous light—as for example room light—entering the cylinder around the edges of the lamp housing is unable to pass directly through the cylinder into the photocell unit. This feature is illustrated in FIGURE 3 of the drawing which shows a ray of light 50 entering the plastic cylinder 11 at a point 52 beyond the edge of the lamp housing 44. As a result of the lamp housing construction, the angle of entry of the light ray 50 is such that it is transmitted into a region adjacent the photocell unit 54, but the high angle of entry causes the light ray to be totally reflected at the surfaces of the cylinder to thereby prevent the extraneous light ray from entering the photocell unit 54. The direct beam, however, transmitted through a slit 46 passes into the chromatographic strip 32 and, because of the fibrous nature of this filter paper strip, the direct beam is scattered on its emergence from the strip into the plastic cylinder, which then transmits the direct beam and condenses it somewhat so that the greater part of a scattered beam passes into the photocell unit 54.

As shown in FIGURES 2 and 3 of the drawing, the photocell unit 54 advantageously comprises a generally wedge-shaped, hollow housing fastened at its narrow end to the fixed axial shaft 12 by the set screw 56. The photocell unit housing is open at its uper end, which is curved to be positioned closely adjacent the inner surface of the hollow cylinder 11. The open end of the photocell housing is adapted to be closed by a glass or colored filter window 58 placed, as near as it is practically possible to do so, to the upper end of the housing 54. Immediately adjacent and beneath the filter window 58 there is positioned a light sensitive, current generating device 60, which advantageously may take the form of a barrier layer type photocell. Electrical connections to the terminals of the photocell 60 are made by the conductors 62 and 64 which are anchored to the terminals 66 and 68, respectively, of the photocell housing.

In accordance with the further features of this invention, as illustrated in FIGURE 2 of the drawing, the axial shaft 12 of the drum is hollow and the conductors 62 and 64 are adapted to pass through the hollow interior of shaft 12 to an electrical connector plug 66 located on the outside of the drum. Manifestly, the electrical connector plug 66 may be connected to the galvanometer terminals of any suitable asociated measuring instrument, which for example may comprise a suitable spectrophotometer, colorimeter or nephelometer of the type manufactured by the Coleman Instruments, Inc. of Maywood, Illinois.

In accordance with a specific feature of this invention, the lamp housing 44 is supported adjacent the outer surface of the drum 10 by an elongated support bar 70 extending between the support arms 22 and 24 in parallel with the axial shaft 12. The support arms 22 and 24 are provided with upwardly extending guide pins 72 and 74 adapted to be inserted in the hole 76 and slot 78 of support bar 70 for positioning and aligning the support bar on the chromatographic reading device. The lamp housing 44 is supportingly secured to the support bar 70 by means of the screws 80 and 82, and in addition the support bar 70 is adapted to support an elongated scale member 84 as by means of the screws 86, 89 and 90.

As shown in greater detail of FIGURE 1 of the drawing, the scale member 84 is marked with the same scale units as the scale on the graph paper 38, which scale may comprise optical density (Beer's law) numbers referring to the corresponding lines on the density axis of the graph paper 38 on which the scale member 84 rests. Since the guide edge 88 of the scale member 84 is in exact alignment with the narrow slit 46 in the lamp housing 44, density values for the chromatographic strip 32 read from the galvanometer may be immediately transferred to the proper density value on the cross section paper 38. Thus, the guide edge 88 of the scale member 84 continuously defines on the graph the portion of the sample strip being examined, and a point on the graph paper located at the junction of the scale edge and the concurrent galvanometer value is always a point on the absorption curve of the sample strip.

It can be seen that by virtue of the guide pins 72 and 74, the support bar 70 is free to move in a vertical direction, and its weight maintains the scale member 84 and the lamp housing 44 in gentle contact with the graph paper 38 and the chromatographic strip 32, respectively. It is a feature of the invention that the entire support bar 70, the scale member 84 and the lamp housing 44 can be removed in a simple and quick manner by merely lifting the entire assembly off the support arms 22 and 24 for the purpose of replacing the chromatographic strip or the graph paper.

In the operation of the invention, the chromatographic strip 32 is secured over the transparent portion of the cylinder 11 and the graph paper 38 is similarly secured over the opaque area of the cylinder 11 such that the beginning of the cross section area of the graph paper is adjacent to the beginning of the dye pattern on the chromatographic strip. The linear relationship between the dye pattern and the ordinate of the graph paper perpendicular to the axis of rotation of the cylinder is thereby positively established, and this relationship can be used to correlate the curve generated on the graph paper with the particular positions on the dye pattern at any time, even after the graph and dye strip have been removed from the drum.

The drum is first rotated so that the beam of light from the lamp housing 44 passes through the chromatographic strip 32 at a point outside of the dyed area of the strip, and the response of the measuring instrument then is adjusted by its controls to bring the indicator of the instrument to a suitable reference value, i.e. full scale. The drum is then turned in suitable increments and at each point to be measured, the dye pattern on the strip will attenuate the light beam so as to give a corresponding measurement of the light beam. This reading, taken from the scale of a measuring instrument which may be calibrated with a suitable non-linear scale to give direct concentration readings, is then transferred to the corresponding value on the scale member 84 and a point is marked adjacent to the edge 88 of the scale member at the proper value on the graph paper. This process is repeated until the complete curve representing the dye pattern of the chromatographic strip is generated on a graph paper.

Those skilled in the art will now appreciate that since the drum is freely rotatable in either direction within the scope of the chromatographic strip, the operator can freely backtrack and fill in additional points as desired in the manner indicated by the developing absorption curve. This unique procedure serves to greatly simplify the mechanics of plotting the absorption curve in addition to insuring far greater accuracy in developing the curve than has been achieved with the prior art constructions.

In accordance with the invention, space is provided on the cross section paper 38 for facilitating the mounting of the sample chromatographic strip in exact juxtaposition to the generated curve. This positioning is conveniently insured by keying the relative positions of the strip and graph paper—first, by making a heavy line across the strip at some nonsignificant region and subsequently, by bringing this line under the elongated slit, as evidenced by a sharp drop in galvanometer reading. A line then is marked on the graph paper along the scale edge in and above the area reserved for strip mounting. The measured strip is then exactly located on the completed graph sheet when the corresponding scale and graph marks are aligned. Further, space is provided on the graph paper 38 for mounting the measured strip after scanning, which space is indicated by the arrow identified with the reference numeral 92.

In accordance with a further feature of the invention the ease of removability and replacement of the lamp housing 44 enables a variety of different lamp housings to be used with the chromatographic reading device when different widths of optical slits are required by the density of a dye pattern or by the resolution desired for the pattern measurement. It is contemplated that a portion of the top side of each lamp housing 44 may be narrowed or thinned out, as indicated by the narrowed portion 94, to enable the lamp housing to provide a translucent spot of light which serves as a pilot light to indicate whether the lamp within the housing is in operative condition.

A further feature of the invention is the ease with which the photocell unit 54 may be removed and/or replaced. As described above, the entire drum and shaft assembly is held by the hold down clamps 26 which enable the entire drum and shaft to be removed from the base 13. The end cap 14 may then be removed from the cylinder 11 and the whole photocell assembly and shaft may be pulled out from the interior of the cylinder 11 for inspection or replacement, either with another similar unit in the event of photocell failure, or with a different unit containing a different filter window if desired. Advantageously, the photocell 60 is permanently sealed in its plastic housing 54 so that the entire housing serves as a replaceable unit. Manifestly, those skilled in the art will readily appreciate that upon removal and replacement of the photocell unit, the polarity of the photocell terminals 66 and 68 must be observed to insure proper reading of the associated galvanometer during scanning of the chromatographic strip.

While there has been shown and described a particular illustrative embodiment of the present invention it will, of course, be understood that various modifications and alternative constructions may be made without departing from the true spirit and scope of the invention. Therefore, it is intended to cover by the appended claims all such modifications and alternative constructions as fall within the true spirit and scope of the invention.

What is claimed as the invention is:

1. The improvement of chromatographic apparatus for use in reading the dye pattern of an electrophoretic strip and in recording absorption curves therefrom comprising the combination of a record supporting hollow drum, a fixed axial shaft extending along the axis of said drum, said drum being freely rotatable in either direction upon said axial shaft, said drum being formed with a transparent portion for receiving the electrophoretic strip to be read and an opaque portion for receiving the graph paper upon which the absorption curve corresponding to the strip dye pattern is to be recorded, fastening means for securing the strip and the graph paper in aligned spatial relation to each other on the surface of said drum, a light source, a housing for said light source, means removably positioning said housing on the outside of said drum in superimposed relation to said strip, said housing having a curved portion corresponding to the curvature of said drum to enable said housing to be positioned closely adjacent the strip on the drum and an optical slit formed in said curved portion to permit a beam of light from said light source to be transmitted through said strip and the transparent portion of said drum, and photocell means positioned within the interior of said drum beneath the strip in alignment with said light source such that the chromatographic dye pattern on said strip may be selectively scanned by rotating said drum to pass the strip between the light source and the photocell whereby the electrical current output of said photocell representative of said dye pattern may be measured to permit the absorption curve of the strip to be recorded on said graph paper.

2. The improvement of chromatographic apparatus for use in reading the dye pattern of an electrophoretic strip and in recording absorption curves therefrom comprising the combination of a record supporting hollow drum, a fixed axial shaft extending along the axis of said drum, said drum being freely rotatable in either direction upon said axial shaft, said drum being formed with a transparent portion for receiving the electrophoretic strip to be read and an opaque portion for receiving the graph paper upon which the absorption curve corresponding to the strip dye pattern is to be recorded, support means for receiving said fixed axial shaft, a light source removably positioned on said support means at the outside of said drum in superimposed relation to said strip, said light source having an optical slit adjacent the strip for transmitting a beam of light through said strip and the transparent portion of said drum, photocell means positioned within the interior of said drum beneath the strip in alignment with said light source such that the chromatographic dye pattern on said strip may be selectively scanned by rotating said drum to pass the strip between the light source and the photocell and density scale means fastened to said support means and positioned in superimposed relation to said graph paper, said density scale means having an edge portion positioned in linear alignment with the optical slit, whereby the electrical current output of said photocell representative of said dye pattern may be measured to permit the absorption curve of the strip to be recorded on said graph paper.

3. The improvement of chromatographic apparatus for use in reading the dye pattern of an electrophoretic strip and in recording absorption curves therefrom comprising the combination of rigid support means, a freely rotatable hollow drum mounted thereon, said drum being formed with a transparent portion for receiving the electrophoretic strip to be read and an opaque portion for receiving the graph paper upon which the absorption curve corresponding to the strip dye pattern is to be recorded, a light source positioned on said support means at the outside of said drum, said light source including an optical slit in superimposed relation to said strip for transmitting a beam of light through said strip and the transparent portion of said drum, photocell means positioned within the interior of said drum beneath the strip in alignment with said light source such that the chromatographic dye pattern on said strip may be selectively scanned by rotating said drum to pass the strip between the light source and the photocell, and density scale means fastened to said support means and positioned in superimposed relation to said graph paper, said density scale means having an edge portion positioned in linear alignment with the optical slit whereby the electrical current output of said photocell representative of said dye pattern may be measured to permit the absorption curve of the strip to be recorded on said graph paper.

4. The improvement of chromatographic apparatus for use in reading the dye pattern of an electrophoretic strip comprising rigid support means, a freely rotatable hollow drum mounted on said support means, said drum being formed with a transparent portion for receiving the electrophoretic strip to be read, a light source positioned on said support means at the outside of said drum said light source including an optical slit in superimposed relation to said strip for transmitting a beam of light through said strip and the transparent portion of said drum, photocell means positioned within the interior of said drum beneath the strip in alignment with said light source such that the chromatographic dye pattern on said strip may be selectively scanned by rotating said drum to pass the strip between the light source and the photocell, graph paper positioned on said drum adjacent said transparent portion and density scale means fastened to said support means and positioned in superimposed relation to said graph paper, said density scale means having an edge portion positioned in linear alignment with the optical slit to facilitate plotting of the absorption curve on said graph paper in accordance with the electrical current output of said photocell means representative of the dye pattern being measured.

5. The improvement of chromatographic apparatus for use in reading the dye pattern of an electrophoretic strip comprising a hollow drum, rigid support means, a fixed axial shaft extending along the axis of said drum and mounted on said support means, said drum being freely rotatable in either direction upon said axial shaft, said drum being formed with a transparent portion for receiving the electrophoretic strip to be read, a light source, a housing for said light source, a portion of said housing adjacent said strip being curved to correspond to the curvature of said drum to enable said housing to be positioned closely adjacent the strip on said drum, an optical slit formed in the curved portion of said housing for directing a sharply defined beam of light of narrow width from said light source to said strip and the transparent portion of said drum, graph means on said drum adjacent said transparent portion, photocell means positioned within the interior of said drum beneath the strip in alignment with said light source such that the cromatographic dye pattern on said strip may be selectively scanned by rotating said drum to pass the strip between the light source and the photocell a density scale means fastened to said support means and positioned in superimposed relation to said graph means, said density scale means having an edge portion positioned in linear alignment with the optical slit in said housing to facilitate plotting of the absorption curve on said graph means in accordance with the electrical current output of said photocell representative of the dye pattern being measured.

6. The improvement of chromatographic apparatus for use in reading the dye pattern of an electrophoretic strip and in recording absorption curves therefrom comprising the combination of a freely rotatable hollow drum, a fixed axial shaft extending along the axis of said drum, said drum being formed with a transparent portion for receiving the electrophoretic strip to be read and an opaque portion for receiving the graph paper upon which the absorption curve corresponding to the strip dye pattern is to be recorded, a light source, a housing for said light source, support means removably positioning said housing on the outside of said drum in superimposed relation to said strip, an optical slit formed in the portion of said housing adjacent the strip to permit a beam of light from said light source to be transmitted through said strip and the transparent portion of said drum, and photocell means positioned within the interior of said drum beneath the strip in alignment with said light source such that the chromatographic dye patatern on said strip may be selectively scanned by rotating said drum to pass the strip between the light source and the photocell whereby the electrical current output of said photocell representative of said dye pattern may be measured to permit the absorption curve of the strip to be recorded on said graph paper.

7. The improvement of chromatographic apparatus in accordance with claim 6 further comprising density scale means fastened to said support means and adapted to be positioned in superimposed relation to said graph paper, said density scale means having an edge portion positioned in linear alignment with the optical slit in said housing.

8. The improvement of chromatographic apparatus in accordance with claim 7 further comprising a support stand for said drum, a pair of upstanding arms provided at each end of said support for receiving said axial shaft, and guide means positioned on said arms for receiving said support means to align the optical slit of said housing and said density scale means with respect to said electrophoretic strip and graph paper, respectively, whenever said support means is removed from and replaced upon said support stand.

9. The improvement of chromatographic apparatus in accordance with claim 6 wherein said housing is formed with a translucent portion adapted to permit the light from said light source to be transmitted therethrough to provide a visual indication of the operative condition of said light source within said housing.

10. The improvement of chromatographic apparatus in accordance with claim 6 wherein said housing is provided with opaque extensions extending substantially from said optical slit over said drum to prevent extraneous light from being transmitted through said strip and drum to said photocell means.

11. The improvement of chromatographic apparatus in accordance with claim 6, further comprising an opaque housing for said photocell means positioned within said hollow drum, said opaque housing being formed with an opening adjacent the transparent portion of said drum for enabling the light beam from said light source to be transmitted to said photocell means and releasable fastening means securing said opaque housing to said axial shaft.

12. The improvement of chromatographic apparatus in accordance with claim 11 further comprising optical filter means positioned within said opaque housing between said opening and said photocell means.

References Cited in the file of this patent

UNITED STATES PATENTS

| | | |
|---|---|---|
| 2,463,534 | Hawkins | Mar. 8, 1949 |
| 2,582,073 | Scudder | Jan. 8, 1952 |